US006713575B2

(12) United States Patent
Yang et al.

(10) Patent No.: US 6,713,575 B2
(45) Date of Patent: Mar. 30, 2004

(54) METHOD FOR PRODUCING HIGHLY PRODUCTIVE SUPPORTED IONIC CATALYST FOR GAS PHASE POLYMERIZATION

(75) Inventors: Xinmin Yang, Franklin Park, NJ (US); Michael D. Awe, Langhorne, PA (US); Natarajan Anand Muruganandam, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 6 days.

(21) Appl. No.: 10/263,546

(22) Filed: Oct. 2, 2002

(65) Prior Publication Data

US 2003/0036613 A1 Feb. 20, 2003

Related U.S. Application Data

(62) Division of application No. 09/631,444, filed on Aug. 2, 2000, now abandoned.

(51) Int. Cl.$^7$ .................................................. C08F 4/42
(52) U.S. Cl. ..................... 526/160; 526/348; 526/943; 526/125.1; 526/131; 526/130; 502/152; 502/103; 502/116; 502/132
(58) Field of Search ................. 526/348, 160, 526/943, 125.1, 131, 130; 502/152, 103, 116, 132

(56) References Cited

U.S. PATENT DOCUMENTS

| | | | |
|---|---|---|---|
| 5,153,157 A | 10/1992 | Hlatky et al. ................. | 502/117 |
| 5,198,401 A | 3/1993 | Turner et al. ................. | 502/155 |
| 5,206,197 A | 4/1993 | Campbell, Jr. ............... | 502/103 |
| 6,291,386 B1 | 9/2001 | Wang .......................... | 502/124 |
| 6,346,586 B1 | 2/2002 | Agapiou et al. | |

FOREIGN PATENT DOCUMENTS

| | | | |
|---|---|---|---|
| EP | 0277004 A1 | | 8/1988 |
| EP | 0500944 A1 | | 2/1992 |
| EP | 0 500 944 | * | 9/1992 |
| EP | 0 522 581 | * | 1/1993 |
| EP | 0522581 A1 | | 1/1994 |
| EP | 0589638 A2 | | 3/1994 |
| WO | WO 91/09882 | | 7/1991 |
| WO | WO 94/00500 | | 1/1994 |
| WO | WO 94/03506 | | 2/1994 |
| WO | WO 97/43323 | | 11/1997 |

OTHER PUBLICATIONS

Nattaya Punrattanasin, Nantaya Yanumet, Pramote Chaiyavech and Erdogan Gulari, Ethylene Polymerization by $Cp_2ZrCl_2$–$B(C_8F_8)_3$–Too Catalyst System Using Low Al/Zr Ratio, *ScienceAsia*, 2002, pp. 377–383, 28.

Helmut G. Alt And Alexander Köppl, Effect of the Nature of Metallocene Complexes of Group IV Metals on Their Performance in Catalytic Ethylene and Propylene Polymerization, *Chem. Rev.*, 2000, pp. 1205–1221, 100, American Chemical Society.

\* cited by examiner

*Primary Examiner*—Ling-Siu Choi

(57) ABSTRACT

A process for the production of an ionic transition metal catalyst in supported form than is highly productive under gas phase olefin polymerization conditions. In the process a an aluminum alkyl is added to a suitable solvent after which a neutral metallocene compound is added to the solution under stirring in a quantity that provides for a ratio of Al to transition metal of at least 25:1. To this metallocene-aluminum alkyl solution is next added an ionic compound the anionic portion of which is a non-coordinating anion under stirring until all materials are dissolve. The ionic compound is added in a quantity that provides for a ratio of NCA to transition metal of at least 1:1. Next the support particles are added to the solution and thereafter the solution is heated to at least 40° C. and held at this elevated temperature for at least 0.5 hour. Thereafter the solvent is removed and the supported catalyst is dried under vacuum.

5 Claims, No Drawings

US 6,713,575 B2

METHOD FOR PRODUCING HIGHLY PRODUCTIVE SUPPORTED IONIC CATALYST FOR GAS PHASE POLYMERIZATION

RELATED APPLICATION DATA

This application is a divisional application of U.S. Ser. No. 09/631,444, filed Aug. 2, 2000, now abandoned.

FIELD OF THE INVENTION

This invention relates to a method for production of catalyst compositions useful for addition reactions of olefinically unsaturated monomers, e.g., polymerization. The invention is particularly useful in coordination polymerization processes that utilize supported compounds for slurry or gas phase polymerization of olefinically unsaturated monomers, and those processes themselves. The ionic catalyst compositions comprise the final product of the interaction between an aluminum alkyl, a metallocene, an anionic activator, and a support.

BACKGROUND OF THE INVENTION

Coordination catalyzed polymerization of olefinically unsaturated monomers is well known and has led to the proliferation in modern society of elastomeric and plastic compositions of matter, such as polyethylene, polypropylene, and ethylene propylene rubber. Early pioneers utilized transition metal compounds the ligands of which were non-organic moieties, such as halides, with activators such as aluminum alkyls. Later development extended this work to bulky organo ligand-containing (e.g., $eta^5$-cyclopentadienyl) transition metals ("metallocenes") with activators such as alumoxanes (a partial hydrolysis product of an aluminum alkyl). More recent developments have shown the effectiveness of ionic catalysts comprised of metallocene cations activated by non-coordinating anions, see for example EP-A-277,004 and U.S. Pat. No. 5,198,401. These references described protonation of metallocene compounds by anion precursors to form stable "ionic" catalysts.

Such ionic catalysts have shown to varying degrees significant sensitivity to catalyst poisons present in monomer feed streams, or in recycled fluid streams, in the polymerization process and have posed problems for use with inert oxide supports that typically have either or both of retained moisture or polar hydroxyl groups. Accordingly, processes have been developed to utilize poison scavenging compounds, as for example alkyl aluminums or alumoxanes, for solution polymerization and to remove or neutralize polar groups retained in or on inert oxide supports. For example, see U.S. Pat. No. 5,153,157, describing Group-IIIA metal scavenger compounds, and WO-A-91/09882, WO-A-94/00500 and WO-A-94/03506 describing supporting techniques utilizing similar compounds. U.S. Pat. No. 5,206,197 describes enhanced polymerization of styrene where the ionic catalyst systems include a metal hydrocarbyl, and, which may be supported. All such documents are referred to herein for their description of metallocene compounds, ionic activators, and useful scavenging compounds.

Whereas these ionic catalyst in unsupported form exhibit acceptable levels of productivity, as measured by a part per million (ppm) content of the transitional metal retained as a residue in the polymer product of about 1 to 1.5 ppm, when placed on a support such as silica, for use in a gas phase polymerization procedure, the productivity of these ionic catalyst often drops to an unacceptable, level i.e., the ppm content of transition metal retained as a residue in the polymer product becomes greater than about 1 to 1.5 ppm.

It is desirable to develop a process for producing a supported form of ionic transition metal catalyst that allows it to maintain its high productivity under gas phase polymerization conditions.

SUMMARY OF THE INVENTION

This invention comprises a process for the production of an ionic transition metal catalyst in supported form than is highly productive under gas phase polymerization conditions. In the process of the invention an aluminum alkyl is added to a suitable solvent after which a neutral metallocene compound is added to the aluminum alkyl solution under stirring in a quantity that provides for a ratio of Al to transition metal of 2:1 to 200:1, preferably at least 25:1, and more preferably at least 50:1 and stirring is continued until substantially all material is dissolved. To this metallocene-aluminum alkyl solution is next added an ionic compound the anionic portion of which is a non-coordinating anion (NCA) as hereafter defined, under stirring until all materials are substantially dissolved. The ionic compound is preferably added in a quantity that provides for a ratio of NCA to transition metal of at least 1:1. Next the support particles are added to the solution and thereafter the solution is heated to at least 40° C., and preferably 90° C., and held at this elevated temperature for at least 0.50 hour, and preferably for at least one hour. Thereafter the solvent is removed and the supported catalyst is dried, preferably under vacuum. A supported ionic catalyst produced in this manner is at least about 150% to 350% more productive under gas phase polymerization conditions than an otherwise identical supported metallocene catalyst that is co-catalyzed with methyl alumoxane.

DETAILED DESCRIPTION OF THE INVENTION

The supported catalyst formed by the process of this invention comprises the product of a sequence of reaction steps wherein first there occurs in a suitable solvent a reaction between a metallocene and an aluminum alkyl to produce a first reaction product that in turn is reacted with an ionic compound that provides a non-coordinating anion (NCA) to the transition metal of the first reaction product after which the resulting transition metal-NCA reaction product is exposed to a support material that is added to the solvent mixture which then elevated in temperature for a period of time before removal of the solvent to recover the catalyst as a free flowing powder.

The Transition Metal Component of the Catalyst

Any catalytically active transition metal compound is suitable in accordance with the invention, including the known transition metal compounds useful in traditional Ziegler-Natta coordination polymerization and, as well, the metallocene compounds similarly known to be useful in coordination polymerization, when such compounds are capable of catalytic activation by an anionic activator. These will typically include transition metal compounds where the metal is in a $d^0$ oxidation state, that is where the metal has its highest oxidation number, and wherein at least one metal ligand can be protonated by the anionic activator, particularly those ligands including hydride, alkyl and silyl. Ligands capable of protonation and transition metal compounds comprising them include those described in the background art, see for example EP-A-277,003, EP-A-277, 004 and U.S. Pat. No. 5,198,401. Synthesis of these compounds is well known from the published literature.

Additional metallocene compounds appear in the patent literature, for example EP-A-0 129 368, U.S. Pat. Nos. 4,871,705, 4,937,299, 5,324,800 EP-A-0-418 044, EP-A-0 591 756, WO-A-92/00333 and WO-A-94/01471. Such metallocene compounds can be described for this invention as mono-, bis, or tris-cyclopentadienyl substituted Group 4, 5, 6, 9, or 10 transition metal compounds wherein the cyclopentadienyl substituents themselves may be substituted with one or more groups and may be bridged to each other, or may be bridged through a heteroatom to the transition metal. The size and constituency of the cyclopentadienyl substituents and bridging elements are not critical to the preparation of the ionic catalyst systems of the invention but should normally be selected in the literature described manner to enhance the polymerization activity and polymer characteristics being sought. Preferably the cyclopentadienyl (or substituted cyclopentadienyl, such as indenyl or substituted indenyl) rings, when bridged to each other, will be lower alkyl-substituted ($C_1$ to $C_6$) in the 2 position additionally and comprise alkyl, cycloalkyl, aryl, alkylaryl and or arylalkyl substituents, the latter as either of fused or pendant ring structures including multi-ring structures, for example, those of U.S. Pat. Nos. 5,278,264 and 5,304,614. Such substituents should each have essentially hydrocarbyl characteristics and will typically contain up to 30 carbon atoms but may be hetero-atom containing with not more than 1–3 non-hydrogen/carbon atoms, e.g., N, S, O, P, and Si.

Metallocene compounds suitable for the preparation of linear polyethylene or ethylene-containing copolymers (where copolymer means comprising at least two different monomers) are essentially any of those known in the art, see again EP-A-277,004, WO-A-92/00333 and U.S. Pat. Nos. 5,198,401, 5,001,205, 5,324,800, 5,308,816, and 5,304,614 for specific listings. Selection of metallocene compounds for use to make isotactic or syndiotactic polypropylene, and their syntheses, are well-known in the art, specific reference may be made to both patent literature and academic, see for example Journal of Organmetallic Chemistry 369, 359–370 (1989). Typically those catalysts are stereorigid asymmetric, chiral or bridged chiral metallocenes. See, For example, U.S. Pat. Nos. 4,892,851, 5,017,714, 5,296,434, 5,278,264, WO-A-(PCT/US92/10066) WO-A-93/19103, EP-A2-0 577 581, EP-A1-0 578 838, and the academic literature "The Influence of Aromatic Substituents on the Polymerization Behavior of Bridged Zirconocene Catalysts", Spaleck, W., et al, Organometallics 1994, 13, 954–963, and "ansa-Zirconocene Polymerization Catalysts with Annelated Ring Ligands-Effects on Catalyst Activity and Polymer Chain Lengths", Brinzinger, H., et al, Organometallics 1994, 13, 964–970, and documents referred to therein. Though many above metallocenes are directed to catalyst systems with alumoxane activators, the analogous metallocene compounds will be useful with the activator anions of this invention for active coordination catalyst systems, when at least one of the halogen containing ligands of the metals (where occurring) are replaced with ligands capable of protonation, for example, via an alkylation reaction as described above, and another is a group into which the ethene group —C=C— may insert, for example, hydride, alkyl, or even the less effective silyl.

Non-limiting representative metallocene compounds include monocyclopentadieny compounds such as pentamethylcyclopentadienyltitanium isopropoxide, pentamethylcyclopentadienyltribenzyl titanium, dimethylsilyltetramethylcyclopentadienyl tert-butylamido titanium dichloride, pentamethyl-cyclopentadienyl titanium trimethyl, dimethylsilyltetramethylcyclopentadienyl-tert-butylamido zirconium dimethyl, Dimethylsilyl-tetramethylcyclopentadienyl-dodecylamido hafnium dihydride, dimethylsilyltetramethylcyclopentadienyl-dodecylamido hafnium dimethyl, unbridged biscyclopentadienyl compounds such as bis(1,3-butyl, methylcyclopentadienyl) zirconium dimethyl, entamethyl-cyclopentadienylcyclopentadienyl zirconium dimethyl; bridged bis cyclopentadienyl compounds such as imethylsilyl-bis(tetrahydroindenyl) zirconium dichloride; bridged bisindenyl compounds such as dimethylsilylbisindenyl zirconium dichloride, dimethylsilylbisindenyl hafnium dimethyl, dimethylsilylbis(2 methylbenzindenyl) zirconium dichloride, dimethylsilylbis(2-methylbenzindenyl) zirconium dimethyl; ethylene bridged compounds such as ethylenebis(indenyl)zirconium dichloride; and the additional mono-, bis-, and triscyclopentadienyl compounds such as those listed and described in U.S. Pat. No. 5,324,800 and EP-A-0 591 756.

Representative traditional Ziegler-Natta transition metal compounds include tetrabenzyl zirconium, tetra bis (trimethylsiylmethyl) zirconium, oxotris (trimethylsilylmethyl) vanadium, tetrabenzyl hafnium, tetrabenzyl titanium, bis(hexamethyl disilazido)dimethyl titanium, tris(trimethyl silyl methyl) niobium dichloride, tris(trimethylsilylmethyl) tantalum dichloride. The important features of such compositions for coordination polymerization are the ligand capable of abstraction by protonation and that ligand into which the ethene (olefinic) group can be inserted. These features enable the protonation of the transition metal compound and the concomitant formation of the ionic catalyst composition of the invention.

Aluminum Alkyl Compounds

As before noted, to prepare the highly productive ionic catalyst in supported form, the metallocene must first be reacted in solution with an aluminum alkyl. For this purpose the aluminum alkyl may comprise any aluminum alkyl within the following formula:

$$Al(R)_{3-x}X_x$$

wherein R is an alkyl group or aryl group, X is a halogen atom, alkoxy group, or hydrogen atom, x is a number and is 0 1 or 2. Preferred alkyl aluminum compounds and a mixture thereof or complex thereof have 1 to 18 carbon atoms, preferably 2 to 6 carbon atoms, such as trialkyl aluminum, dialkyl aluminum monohalide, monoalkyl aluminum dihalide, alkyl aluminum sesquihalide, dialkyl aluminum monoalkoxide, and dialkyl aluminum monohydride. Examples of such compounds include trialkyl aluminum such as trimethyl aluminum, triethyl aluminum, tripropyl aluminum, triisobutyl aluminum, and trihexyl aluminum; dialkyl aluminum monohalide such as dimethyl aluminum chloride, diethyl aluminum chloride, diethyl aluminum bromide, diethyl aluminum iodide, and diisobutyl aluminum chloride; monoalkyl aluminum dihalide such as methyl aluminum dichloride, ethyl aluminum dichloride, ethyl aluminum dibromide, ethyl aluminum diiodide, and isobutyl aluminum dichloride; alkyl aluminum sesquihalide such as ethyl aluminum sesquichloride; dialkyl aluminum monoalkoxide such as dimethyl aluminum methoxide, diethyl aluminum ethoxide, diethyl aluminum phenoxide, dipropyl aluminum ethoxide, and diisobutyl aluminum phenoxide; and dialkyl aluminum hydride such as dimethyl aluminum hydride, diethyl aluminum hydride, dipropyl aluminum hydride, and diisobutyl aluminum hydride.

Preferred aluminum alkyls for use within this invention are triethyl aluminum, tripropyl aluminum, and tri isobutyl aluminum.

Co-Catalyst Activator Compositions

The supported ionic catalyst composition of the invention can be prepared, for example, by selecting as the Lewis acid which forms the Lewis acid-base complex, one that is capable of serving as a suitable counter anion upon protonation of the transition metal compound with the proton from Lewis acid-base hydroxyl group complex. Activation of the transition metal compound to a catalytic state may be achieved with ionizing compounds which contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-A-500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

A preferred class of compatible non-coordinating anions (NCA) includes chemically stable, non-nucleophilic substituted anionic complexes having a molecular diameter of about 4 Angstroms or more.

Any metal or metalloid compound capable of forming an anionic complex which is resistant to irreversibly transferring a substituent or fragment to the cation to neutralize the cation to produce a neutral molecule may be used as the NCA. In addition any metal or metalloid capable of forming a coordination complex that is stable in water may also be used or contained in a composition comprising the anion. Suitable metals include, but are not limited to aluminum, gold, platinum, and the like. Suitable metalloids include, but are not limited to, boron, phosphorus, silicon, and the like. Compounds containing anions that comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

In general, preferred NCAs may be represented by the following general formula:

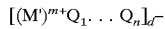

wherein: M is a metal or metalloid; $Q_1$ to $Q_n$ are, independently, hydride radicals, dialkylamido radicals, alkoxide and aryloxide radicals, hydrocarbyl and substituted hydrocarbyl radicals, halocarbyl and substituted-halocarbyl radicals and hydrocarbyl and halocarbyl-substituted organometalloid radicals and any one, but not more than one of $Q_1$ to $Q_n$ may be a halide radical; m is an integer representing the formal valence charge of M'; n is the total number of ligands Q, and d is an integer greater than or equal to 1.

It is of course understood that the anions described above and below may be counter balanced with a positively charged component that is removed before the anion reacts with the cation.

In a preferred embodiment M' is boron, n=4, $Q_1$ and $Q_2$ are the same or different aromatic or substituted-aromatic hydrocarbon radicals containing from about 6 to about 20 carbon atoms and may be linked to each other through a stable bridging group; and $Q_3$ and $Q_4$ are, independently, hydride radicals, hydrocarbyl and substituted-hydrocarbyl radicals, halocarbyl and substituted-halocarbyl radicals, hydrocarbyl- and halocarbyl-substituted organometalloid radicals, disubstituted pnictogen radicals, substituted chalcogen radicals and halide radicals, with the proviso that $Q_3$ and $Q_4$ will not be halide at the same time.

Illustrative, but not limiting, examples of boron components which may be used as NCAs are: tetra-valent boron compounds such as tetra(phenyl)boron, tetra(p-tolyl)boron, tetra(o-tolyl)boron, tetra(pentafluorophenyl)boron, tetra(o, p-dimehtylphenyl)boron, tetra(m,m-dimethylphenyl)boron, (p-tri-fluoromethylphenyl)boron and the like.

In a particularly preferred embodiment M=boron, n=4, $Q_1$, $Q_2$ and $Q_3$ are each ($C_6 F_5$) and $Q_4$ is as defined above. Illustrative but not limiting, examples of these preferred NCAs comprising boron triphenylmethyl salts where Q is a simple hydrocarbyl such as methyl, butyl, cyclohexyl, or phenyl or where Q is a polymeric hydrocarbyl of indefinite chain length such as polystyrene, polyisoprene, or poly-paramethylstyrene. Another preferred class of NCAs is that class comprising those NCA containing a plurality of boron atoms, including boranes and carboranes.

Illustrative, but not limiting, examples of NCAs include carboranes such as dodecaborate, decachlorodecaborate, dodecachlorododecaborate, 1-carbadecaborate, 1-carbadecaborate, 1-trimethylsilyl-1-carbadecaborate; borane and carborane complexes and salts of borane and carborane anions such as decaborane(14), 7,8-dicarbadecaborane(13), 2,7-dicarbaundecaborane(13), undecahydrido-7,8-dimethyl-7,8-dicarbaundecaborane, 6-carbadecaborate(12), 7-carbaundecaborate, 7,8-dicarbaudecaborate; and metallaborane anions such as bis (nonahydrido-1,3-dicarbanonaborato)cobaltate(III), bis (undecahydrido-7,8-dicarbaundecaborato)ferrate(III), bis (undecahydrido-7,8-dicarbaundecaborato) cobaltate(III), bis (undecahydrido-7,8 dicarbaunaborato)nikelate(III), bis (nonahydrido-7,8-dimethyl-7,8-dicarbaundecaborato)-ferrate(III), bis(tribromooctahydrido-7,8-dicarbaundecaborato)-cobaltate(III), bis-(undecahydridodicarbadodecaborato)cobaltate(III) and bis (undecahydrido-7-carbaundecaborato)cobaltate(III).

The NCA compositions most preferred for forming the catalyst system used in this process are those containing a tris-perfluorophenyl boron, tetrapentafluorphenyl boron anion and/or two or more tripentafluorophenyl boron anion groups covalently bond to a central atomic molecular or polymeric complex or particle. A particularly preferred ionic compound utilized to provide the NCA is dimethyl anilinium tetrakis (pentafluorophenyl)borate.

The Support Material

For purposes of this patent specification the terms "carrier" or "support" are used interchangeable and can be any support material, preferably a porous support material, such as for example, talc, inorganic oxides, inorganic chlorides, for example magnesium chloride and resinous support materials such as polystyrene polyolefin or polymeric compounds or any other organic support material and the like that has an average particle size greater than 10 $\mu$m.

The preferred support materials are inorganic oxide materials, which include those from the Periodic Table of Elements of Groups 2, 3, 4, 5, 13 or 14 elemental oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carrier of the catalyst of this invention has a surface area in a range of from about 10 to about 700 m²/g, pore volume in a range of from about 0.1 to about 4.0 cc/g and an average particle size in a range of from about 10 to about 500 μm. More preferably, the surface area is in the range of from about 50 to about 500 m²/g, pore volume is of from about 0.5 to about 3.5 cc/g and average particle size is of from about 20 to about 200 μm. Most preferably the surface area range is from about 100 to about 400 m²/g, pore volume is from about 0.8 to about 3.0 cc/g and average particle size is from about 30 to about 100 μm. The carrier of the invention typically has pore size in the range of from 10 to 1000 Å, preferably 50 to about 500 Å, and most preferably 75 to about 350 Å.

Because of availability, both of silica and silica containing metal oxide based supports, for example, silica-alumina, are preferred. Silica particles, gels and glass beads are most typical.

Forming the Supported Catalyst

In the process of the invention an aluminum alkyl is added to a suitable solvent after which a neutral metallocene compound is added to the solution under stirring in a quantity that preferably provides for a ratio of Al to transition metal of at least 50:1. To this metallocene-aluminum alkyl solution is next added an ionic compound the anionic portion of which is a non-coordinating anion (NCA) under stirring until all materials are dissolve. The ionic compound is added in a quantity that provides for a ratio of NCA to transition metal of at least 1:1. Next the support particles are added to the solution and thereafter the solution is heated to at least 40° C. and held at this elevated temperature for at least 0.5 hour. Thereafter the solvent is removed and the supported catalyst is dried under vacuum.

For the purposes of this patent specification and appended claims the term "solution" includes a suspension, a slurry or a mixture. Any compatible solvent or other liquid capable of forming a solution or the like with at least one metallocene catalyst component and/or at least one activator of the invention can be used.

As indicated, the improved catalyst compositions of the present invention will be prepared in a suitable solvent or diluent. Suitable solvents or diluents include any of the solvents known in the prior art to be useful as solvents in the polymerization of olefins, diolefins and acetylenically unsaturated monomers. Non-limiting examples of solvents are those aliphatic, aromatic and saturated hydrocarbons and cyclic hydrocarbons, such as isopentane, heptane, toluene, and the like. Suitable solvents, then, include, but are not necessarily limited to, straight and branched-chain hydrocarbons such as isobutane, butane, pentane, hexane, heptane, octane and the like; cyclic and alicyclic hydrocarbons such as cyclohexane, cycloheptane, methylcyclohexane, methylcycloheptane and the like and aromatic and alkyl-substituted aromatic compounds such as benzene, toluene, xylene and the like. The more preferred solvents are the cyclic aliphatic and aromatic hydrocarbons, the most preferred of which is toluene.

In the first step of the process the aluminum alkyl and metallocene may be brought together in the solvent by any convenient means, meaning that each may be separately dissolved in an alloquate of the solvent then these two solvent portions combined, or one or the other of the components may first be dissolved in the solvent and thereafter the other of the components then added to the solvent. The combination of the metallocene and aluminum alkyl in the solvent may be achieved at ambient temperature or at an elevated temperature not exceeding that of the boiling point of the solvent. The quantity of aluminum alkyl compared to the metallocene should be selected so as to achieve a ratio of aluminum to transition metal of the metallocene in the range of 2:1 to 200:1, preferably at least 25:1, and more preferably at least 50:1, there generally be no further advantage to the use of greater quantities of the aluminum alkyl than that of a 200:1 ratio. The ingredients are preferably kept under stirring for about 15 minutes or until no further color change is observed to occur in the solution.

Next, to the metallocene-aluminum alkyl solution the ionic compound is added under stirring in a quantity that puts its non-coordinating anion moiety in a ratio to the transition metal of the metallocene in the range of 0.9:1 to 2:1, and preferably in the range of 0.9:1 to 1:1.1, most preferably in a range of 1:1 to 1.1:1, and ideally at a ratio of 1:1. This addition of the ionic compound to the solution may be achieved at ambient temperature or at an elevated temperature not exceeding that of the boiling point of the solvent.

Next, to the metallocene-aluminum alkyl-ionic compound solution is added under stirring the support particles in a quantity that will provide the desired loading of transition metal on the support which generally ranges from 0.05 to 0.50 weight per cent of the total dry weight of the catalyst, and is preferably 0.15 to 0.50 weight per cent. Following addition of the support to the solution the temperature of the metallocene-aluminum alkyl-ionic compound-support solution should be elevated to at least 40° C., preferably 60° C., more preferably 90° C., and most preferably to a temperature just below the boiling point of the solvent by a degree or two. The metallocene-aluminum alkyl-ionic compound-support solution is held at this elevated temperature for at least 5 minutes, preferably 15 minutes, more preferably for 30 minutes, and most preferably for 60 minutes. Following this passage of time the solvent may be removed by evaporation or other means to recover a free flowing powder product that is an active catalyst.

Polymerization with the Supported Catalyst

This catalyst of this invention is useful in coordination polymerization of unsaturated monomers conventionally known to be polymerizable under slurry or gas phase coordination polymerization conditions. The supported catalysts of the invention are thus particularly useful in the known operating modes employing fixed-bed, moving-bed, fluid-bed, or slurry processes conducted in single, series or parallel reactors.

Linear polyethylene, including high and ultra-high molecular weight polyethylenes, including both homo- and copolymers with other alpha-olefin monomers, alpha-olefinic and/or non-conjugated diolefins, for example, $C_3$ to $C_{20}$ olefins/diolefins, are produced by adding ethylene, and optionally the other monomers, to a reaction vessel under low pressure (typically <50 bar), at a typical temperature of 20–250° C. with the invention catalyst that has been slurried with a solvent, such as heptane, toluene or mineral oil. Heat of polymerization is typically removed by cooling. In slurry phase polymerization the polymer forms as granules that are usually insoluble in the reaction diluent. Termination of polymerization generally occurs via beta hydride elimination resulting in terminal olefinic unsaturation or by the addition of a chain transfer agent such as hydrogen or aluminum alkyl resulting in chain end saturation. The polymer may be filtered or centrifuged off, washed, and dried, i.e., for slurry reactions. As indicated, chain transfer agents should be avoided if chain end unsaturation is to be retained.

Gas phase polymerization can be conducted, for example, in a continuous fluid bed gas-phase reactor operated at 2000–3000 kPa and 60–160° C., using hydrogen as a reaction modifier (100–200 ppm), $C_{4-C8}$ comonomer feedstream (0.5–1.2 mol %), and $C_2$ feedstream (25–35 mol %).

See, U.S. Pat. Nos. 4,543,399, 4,588,790, 5,028,670 and co-pending U.S. patent application Ser. No. 08/053,067 filed Apr. 26, 1993.

Polypropylene typically can be prepared essentially as described for linear polyethylene above. The reaction diluent is often comprised of liquid propylene monomer in which the supported ionic catalyst is slurried. Other monomers, typically the lower alpha-olefins (e.g., $C_2$ to $C_{10}$) and/or non-conjugated diolefins, can be introduced into the reaction diluent or solvent when either of polyethylene or polypropylene copolymers are to be prepared. The polymerization reactions for all of linear polyethylene, polypropylene and polyolefin polymers may be conducted in any suitable reactor, for example, in batch, continuous flow, parallel or series reactors.

Ethylene-alpha olefin(-diolefin) elastomers of high molecular weight and low crystallinity can be prepared utilizing the catalysts of the invention by introducing ethylene gas into a slurry utilizing the alpha olefin or mixture thereof with other monomers, polymerizable and not, as a polymerization diluent in which the invention catalyst is suspended. Typical ethylene pressures will be between 10 and 1000 psig (69–6895 kPa) and the polymerization diluent temperature will typically be between −10–100° C. The process can be carried out in a stirred tank reactor, or more than one operated in series or parallel. Deashing can be accomplished in accordance with conventional knowledge in the art, or if to be avoided a process using one or more fixed bed or packed column reactors (see below) may be used. See the general disclosure of U.S. Pat. No. 5,001,205 for general process conditions and selection of preferred transition metal compounds.

Pre-polymerization of the supported catalyst of the invention may also be used for further control of polymer particle morphology in typical slurry or gas phase reaction processes in accordance with conventional teachings. For example such can be accomplished by pre-polymerizing a $C_2$ to $C_6$ alpha olefin for a limited time, for example, ethylene is contacted with the supported catalyst at a temperature of −15 to 30° C. and ethylene pressure of up to about 250 psig (1724 kPa) for 75 min. to obtain a polymeric coating on the support of polyethylene of 30,000–150,000 molecular weight. The pre-polymerized catalyst is then available for use in the polymerization processes referred to above. In a similar manner, the activated catalyst on a support coated with a previously polymerized thermoplastic polymer can be utilized in these polymerization processes.

Additionally it is preferred to avoid the effect of polymerization poisons that may be introduced via feedstreams, solvents or diluents, by removing or neutralizing the poisons. For example, monomer feed streams or the reaction diluent may be pre-treated, or treated in situ during the polymerization reaction, with a suitable scavenging agent. Typically such will be an organometallic compound employed in processes such as those using the Group-13 organometallic compounds of U.S. Pat. No. 5,153,157 and WO-A-91/09882 and WO-A-94/03506, noted above, and that of WO-A-93/14132. Preferably the amount of scavenging agent is minimized, or avoided altogether, during polymerization reactions when it is desired to retain terminal unsaturation since they tend to act as chain transfer agents resulting in terminal saturation.

Other olefinically unsaturated monomers besides those specifically described above may be polymerized using the catalyst according to the invention either by coordination or carbocationic polymerization, for example, styrene, alkyl-substituted styrene, ethylidene norbornene, norbornadiene, dicylopentadiene, cyclopentene, norbornene and other alpha olefinic unsaturated and strained geometry cyclic olefins, isobutylene, isoprene, butadiene, vinyl ethers, vinyl carbazoles, etc. Additionally because of the ability of the catalytically active transition metal based catalysts of the invention to incorporate higher alpha-olefin monomers, alpha-olefinic macromonomers of up to 100 mer units, or more, may also be incorporated by copolymerization. The resulting polymers may be homopolymers or copolymers of more than one monomer, and may be of any of the recognized tacticity forms depending upon the selection of metallocene cation precursor and monomer in accordance with conventional knowledge in the art. See for example: U.S. Pat. Nos. 5,066,741 and 5,206,197, which address the preparation of syndiotactic vinyl aromatic polymers with single $eta^5$-cyclopentadienyl metallocene compounds activated by non-coordinating, compatible anions; U.S. Pat. Nos. 5,278,265, and 5,304,523 addressing preparation of isotactic and syndiotactic polypropylene under low temperature conditions using stereorigid metallocenes with non-coordinating anions; and, U.S. Pat. No. 5,324,801 addressing preparation of cyclic olefin-containing copolymers using specific metallocene compounds as catalysts, each of which can be activated in accordance with this invention.

The alpha-olefin based polymers produced with invention catalyst system have utility according to molecular weight, level of comonomer incorporation, where included, and polydispersity ("MWD"), etc. for their conventional and known uses. Thus films, fibers, and moldable thermoplastics by any of the known means of melt processing and subsequent extrusion, and/or, thermoforming are typical applications. In such, inclusion of additives such as processing aids, stabilizers, pigments, fillers as conventionally known can be utilized. High density polyethylene and isotactic polypropylene films, including those that are oriented in one or both axes and those modified with other components such as hydrocarbon tackifier resins are specific examples.

Further, inclusion of other thermoplastic components both in greater and lower amounts will be useful as known for various polymer blends and compositions. Thus the use of elastomeric polyolefins of the invention for impact modification of polar engineering resins or in co-vulcanizable elastomer blends (typically when containing diolefin comonomer and/or further derivatized as by free-radical grafting of polar monomers) is suitable. For a preferred derivatization process see WO-A-93/12148 and equivalent U.S. Pat. No. 5,424,367.

EXAMPLES

Catalyst Preparation

For the various catalyst preparation given hereafter the materials utilized were racemic ethylenebis(indenyl) dichloride (>99% pure chemically with no detectable meso isomer by 1H NMR) and dimethyl anilinium tetrakis (pentafluorophenyl)borate supplied by Strem Chemicals, Mass. or by Boulder Scientific Co., Colo. Methyl alumoxane (MAO) as a 30% by weight solution in toluene was supplied by Albemarle. As solvent toluene distilled from sodium metal was used. Silica 955-600 by Davison and silica ES70 by Crossfield was used as the support.

Comparative MAO Catalyst Catalyst A

In a glove box, the amount of MAO and toluene solvent were added to a 1 liter flask after which ethylenebis(indenyl) zirconium dichloride was added slowly as a powder over a five minute period. The quantities of each provided for there to be in solution an Al/Zr metal ratio of 121/1. This solution was stirred at room temperature for 20 minutes. Then silica was added to this solution slowly over 5 to 10 minutes in an amount that provide for the final catalyst to carry 0.035 mmole/g of Zr metal and 4.23 mmole/g of Al metal. The slurry was taken out of the glove box and heated using an oil bath to 40° C. for 20–30 minutes. Then toluene solvent was removed under vacuum while maintaining the slurry at 40° C. The catalyst recovered was dried over night under vacuum at room temperature to a free flowing powder. Chips were removed using a #18 mesh screen before mixing the catalyst with Kaydol oil.

Comparative MAO Catalyst Catalyst B

The same procedure as for Comparative A was followed except that (i) the catalyst was made in a larger apparatus in a catalyst synthesis lab, (ii) the final catalyst was made to carry 0.045 mmole/g of Zr metal and 5.09 mmole/g of Al metal, (iii) after addition of the silica the solution was left to stand at room temperature over night, and (iv) the slurry was heated to 90° C. for 30 minutes and toluene was removed at 75–85° C.

off the reaction in the case of Catalyst 1 and C. The cofeed alkyl was fed at a molar ratio of TIBA/Zr of 125.

The reactor is an 8" fluid bed reactor with a 20–30 pound bed weight during lined-out operation. In the semi-batch mode, polymer product remains in the reactor and grows through out the operation. The product is removed at the end of the batch which lasts about 8 hours. In the continuous mode, the reactor is started up the same as for batch runs until the polymer bed grows to about 20 lb. At this point, product is discharged intermittently using the cyclic product discharge system (PDS). The PDS system discharges about 0.4 lbs. each cycle into the product box. The reactor is then operated in a continuous steady state mode with a more or less constant product inventory for the remainder of the run. A continuous mode run lasts about 8 hours.

The results of the polymerization runs are given in table 1 below.

TABLE 1

| Catalyst | Silica Type | Impregnation Temp. ° C. | Melt Index | Melt Flow Ratio | Density G/cc | Zr ppm Residue | Temp ° C. | Press./ $C_6:C_2$ | $H_2:C_2$ | Cofeed alkyl* fed at Al/Zr ratio |
|---|---|---|---|---|---|---|---|---|---|---|
| A | 955–600 | 40 | 0.5 | 90 | 0.918 | 0.9 | 80 | 240 psia/ 0.012 | 0.0015 | 0 |
| B | ES70 | 90 | 1.0 | 68 | 0.920 | 1.4 | 80 | 240 psia/ 0.015 | 0.0015 | 0 |
| 1 | ES70 | 90 | 0.7 | 85 | 0.921 | 0.3 | 80 | 240 psia/ 0.015 | 0.0036 | 125 |
| C | 955–600 | 20 | 1.3 | 87 | 0.914 | 0.6 | 80 | 240 psia/ 0.015 | 0.0025 | 125 |

*triisobutylaluminum

Invention Catalyst Catalyst 1

Inside a glove box 160 ml of tri isobutyl aluminum was added to 300 ml of toluene with stirring in a 1-liter flask. Then 1.1812 g of ethylenebis(indenyl)zirconium dichloride was added. The solution had a slight yellow color. The solution was stirred for 15 minutes at room temperature, then 2.1752 g of dimethyl anilinium tetrakis (pentafluorophenyl)borate was slowly added. The solution turned mush darker to a brown/yellow color. After stirring for another 15 minutes at room temperature everything was soluble and 62 g of silica (Crossfield ES70) was slowly added. The flask was a little bit warm. The solution was removed from the glove box then heated to 90° C. for 1 hour. Toluene solvent was removed by evaporation at an initial temperature of 85° C. for the first 5 minutes then the temperature was lower to 75° C. until most solvent was removed. Recovered were yellow solids that were dried over night under vacuum.

Comparative Catalyst C

The procedure as for Invention Catalyst 1 was followed except the metallocene-aluminum alkyl-ionic compound-support solution was not heated to 90° C., but instead was dried under vacuum at 20° C.

Polymerization with Comparative and Inventive Catalyst

Polymerizations were conducted in a small-scale, semi-batch polymerization reactor designed to evaluate performance of new catalysts and catalyst systems under realistic commercial gas-phase conditions. The system was designed to provide product samples of sufficient quality and quantity to permit sample evaluation on polymer processing equipment representative of that used commercially. A cofeed alkyl, triisobutyl aluminum (TIBA) was necessary to kick The above data demonstrates that a supported ionic catalyst made by the process of this invention is about 430% more productive than an otherwise identical supported catalyst that is activated by MAO (Catalyst 1 Zr ppm. of 0.3×4.3=catalyst B Zr ppm of 1.4). The above data also demonstrates the preference for an elevated impregnation temperature.

While the present invention has been described and illustrated by reference to particular embodiments thereof, it will be appreciated by those of ordinary skill in the art that the invention lends itself to variations not necessarily illustrated herein. For these reason, then, reference should be made solely to the appended claims for the purposes of determining the true scope of the present invention.

We claim:

1. A method for polymerizing olefins comprising the steps of (a) contacting one or more polymerizable olefins under gas phase or slurry phase polymerizing conditions with an ionic catalyst resulting from mixing a metallocene and an aluminum alkyl in a solvent until all materials substantially dissolve; adding to said metallocene-aluminum alkyl solution an ionic compound comprising an anionic moiety that provides a non-coordinating to a transition metal cation provided by the metallocene; introducing support particles into the metallocene-aluminum alkyl-ionic compound solution; elevating the metallocene-aluminum alkyl-ionic compound solution in temperature to at least 40° C. and maintaining the elevated temperature for at least 0.5 hour; and removing the solvent to recover a solid free flowing powder, and (b) recovering polymer product.

2. The method of polymerizing of claim 1 wherein the ionic catalyst has a ratio of aluminum to transition metal of at least 25:1.

3. The method of polymerizing of claim 1 wherein the ionic catalyst has a ratio of aluminum to transition metal of at least 50:1.

4. The method of polymerizing of claim 1 wherein the ionic catalyst has a ratio of anionic moiety that is non-coordinating to transition metal cation in a range of 1:1 to 0.90:1.

5. The method of polymerizing of claim 2 wherein the ionic catalyst results at least in part from elevating the metallocene-aluminum alkyl-ionic compound solution in temperature to at least 90° C.

* * * * *